United States Patent [19]
Emoto

[11] Patent Number: 5,891,485
[45] Date of Patent: Apr. 6, 1999

[54] BUILT-IN MOTOR TYPE ELECTRIC INJECTION MOLDING APPARATUS

[75] Inventor: Atsushi Emoto, Chiba, Japan

[73] Assignee: Sumitomo Heavy Industries, Ltd., Japan

[21] Appl. No.: 866,114

[22] Filed: May 30, 1997

[51] Int. Cl.$^6$ .................................................. B29C 45/77
[52] U.S. Cl. .......................... 425/145; 264/40.7; 425/149; 425/167; 425/542
[58] Field of Search .................................. 425/144, 145, 425/149, 167, 542; 264/40.7

[56] References Cited

U.S. PATENT DOCUMENTS

| | | | |
|---|---|---|---|
| 4,758,146 | 7/1988 | Piazzola | 425/144 |
| 5,679,384 | 10/1997 | Emoto | 425/145 |

Primary Examiner—Tim Heitbrink
Attorney, Agent, or Firm—Lorusso & Loud

[57] ABSTRACT

There is disclosed a built-in motor type electric injection molding apparatus which can prevent a decrease in the output ratings of a metering motor and a injection motor and which enables the selection of optimal drive characteristics corresponding to the load thereof in use. In a metering stage, the metering motor is driven in order to rotate its rotor. The rotation produced by the metering motor is transmitted to a screw via a drive force transmission mechanism, so that the screw is retracted with rotation so as to meter resin. In an injection stage, the injection motor is driven in order to rotate its rotor. The rotational motion produced by the injection motor is converted into linear motion by a motion conversion mechanism, and the linear motion is transmitted to the screw, so that the screw is advanced so as to inject the resin. Since a ventilation unit ventilates first and second motor accommodation chambers, heat generated by driving the metering motor and the injection motor is released to the outside of a casing.

5 Claims, 3 Drawing Sheets

BUILT-IN MOTOR TYPE ELECTRIC INJECTION MOLDING APPARATUS

BACKGROUND OF THE INVENTION

1. Field of the Invention

The present invention relates to a built-in motor type electric injection molding apparatus.

2. Description of the Related Art

Conventionally, in an injection molding apparatus, resin heated and melted in a heating cylinder is injected into a cavity of a die under a high pressure so that the cavity is filled with the resin. The molten resin is then cooled and hardened to obtain a molded product. The molded product is then taken out from the die after the die is opened.

The injection molding apparatus includes a die clamp apparatus and an injection apparatus. The die clamp apparatus is provided with a stationary platen and a movable platen, and the die is opened and closed by advancing and retracting the movable platen using a die clamping cylinder.

The injection apparatus includes a heating cylinder for heating and melting resin supplied from a hopper and an injection nozzle for injecting the molten resin. Further, a screw is disposed within the heating cylinder for advancing and retracting movement. The screw is advanced to inject resin and retracted to meter the resin.

An electric injection molding apparatus has been proposed in which electric motors are used to advance and retract the injection apparatus and to advance and retract the screw.

FIG. 1 is a schematic view of an injection apparatus used in a conventional electric injection molding apparatus.

In FIG. 1, numeral 2 denotes an injection apparatus, and numeral 4 denotes a frame of the injection apparatus 2. A heating cylinder 21 is fixed on the front side (left side in FIG. 1) of the frame 4, and an unillustrated injection nozzle is provided at the front end (left-side end in FIG. 1) of the heating cylinder 21. A screw 20 is disposed within the heating cylinder 21 such that the screw 20 is rotatable and axially movable. A ball screw 31 is formed at the rear end portion of the screw 20 and a spline shaft 32 is extended from the rear end of the ball screw 31.

An injection motor 34 is attached to the frame 4 such that the injection motor 34 surrounds the ball screw 31, and a ball screw nut 37 is fixed to the injection motor 34. Further, a metering motor 35 is disposed such that the metering motor 35 surrounds the spline shaft 32, and a spline nut 38 is fixed to the metering motor 35.

A numerical controller 39 is connected to the injection motor 34 and to the metering motor 35. Injection and metering are performed by selectively rotating these motors 34 and 35 by the numerical controller 39. In detail, in a metering stage, the metering motor 35 and the injection motor 34 are simultaneously rotated at the same speed, so that the spline shaft 32, the ball screw 31 and the screw 20 rotate for metering. At this time, power supplied to the injection motor 34 can be adjusted to provide a difference in rotational speed between the ball screw nut 37 and the spline nut 38, thereby retracting the screw 20. With this operation, back pressure can be controlled during metering.

In an injection stage, the injection motor 34 is rotated while the metering motor 35 is stopped, so that the ball screw 31 is advanced by rotation of the ball screw nut 37. As a result, the screw 20 is advanced to perform injection.

However, in the injection apparatus of the conventional electric injection molding apparatus, when heat generated by the metering motor 35 and the injection motor 34 is accumulated within an unillustrated drive case, the metering motor 35 and the injection motor 34 overheat, thus lowering the output ratings of the metering motor 35 and the injection motor 34. In addition, it is impossible to select optimal drive characteristics corresponding to the load of the electric injection molding apparatus in use.

SUMMARY OF THE INVENTION

An object of the present invention is to solve the above-mentioned problems in the injection apparatus of the conventional electric injection molding apparatus, and to provide a built-in motor type electric injection molding apparatus which can prevent a decrease in the output ratings of a metering motor and a injection motor and which enables the selection of optimal drive characteristics corresponding to the load thereof.

To achieve the above object, a built-in motor type electric injection molding apparatus according to the present invention comprises a casing; a first rotor shaft rotatably supported within the casing and forming a first motor accommodation chamber with the casing; a metering motor disposed within the first motor accommodation chamber and provided with a rotor fit onto the first rotor shaft; a second rotor shaft rotatably supported within the casing and forming a second motor accommodation chamber with the casing; an injection motor disposed within the second motor accommodation chamber and provided with a rotor fit onto the second rotor shaft; drive force transmission means disposed within the first rotor shaft and adapted to transmit rotation produced by the metering motor to a screw; motion conversion means disposed within the second rotor shaft and adapted to convert rotational motion produced by the injection motor into linear motion and to transmit the linear motion to the screw; and ventilation means disposed on the casing and adapted to ventilate the first and second motor accommodation chambers.

In this case, in a metering stage, the metering motor is driven in order to rotate its rotor. The rotation produced by the metering motor is transmitted to the screw via the drive force transmission means, so that the screw is retracted with rotation so as to meter resin.

In an injection stage, the injection motor is driven in order to rotate its rotor. The rotational motion produced by the injection motor is converted into linear motion by the motion conversion means and the linear motion is transmitted to the screw, so that the screw is advanced so as to inject the resin.

Since the ventilation means ventilates the first and second motor accommodation chambers, heat generated by the metering motor and the injection motor is released to the outside of the casing. Since no heat accumulates within the casing, the metering motor and the injection motor do not overheat, thus preventing a decrease in the output ratings of the metering motor and the injection motor.

In addition, since optimal drive characteristics of the metering motor and the injection motor can be selected corresponding to such load of the built-in motor type electric injection molding apparatus in use, as the molding cycle and load cycle thereof, the metering motor and the injection motor can be driven more efficiently.

In another built-in motor type electric injection molding apparatus, the ventilation means is composed of a first and second ventilation means, and the first and second ventilation means independently ventilate the first and second motor accommodation chambers, respectively.

In this case, when only the metering motor is driven, only the first ventilation means is operated, and when only the injection motor is driven, only the second ventilation means is operated. Accordingly, the power consumption of the built-in motor type electric injection molding apparatus can be reduced.

In still another built-in motor type electric injection molding apparatus, the second ventilation means comprises a plurality of fans, each of which is operated independently.

In this case, the number of the fans to be operated can be changed in accordance with the driving state of the injection motor. Accordingly, the power consumption of the built-in motor type electric injection molding apparatus can be decreased.

In still another built-in motor type electric injection molding apparatus, a temperature sensor is provided within each of the first and second motor accommodation chambers, and each of the first and second ventilation means is driven based on the temperature detected by the temperature sensor.

In this case, each of the first and second ventilation means can be driven based on the temperature detected by the temperature sensor, each of the first and second motor accommodation chambers can be ventilated only when ventilation is needed. Accordingly, the power consumption of the built-in motor type electric injection molding apparatus can be decreased.

BRIEF DESCRIPTION OF THE DRAWINGS

The structure and features of a built-in motor type electric injection molding apparatus according to the present invention will be readily appreciated as the same becomes better understood by referring to the accompanying drawings, in which.

DESCRIPTION OF PREFERRED EMBODIMENT

An embodiment of the present invention will next be described in detail with reference to the drawings.

Figure 1:
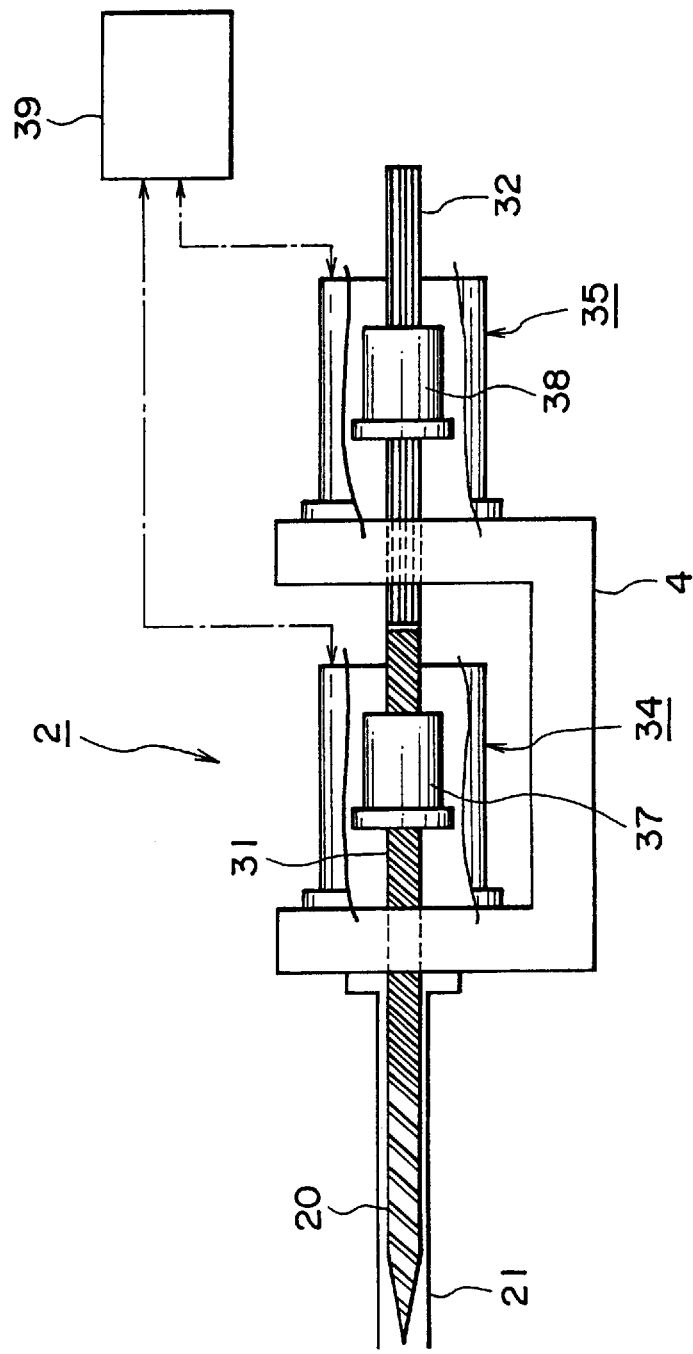
FIG. 1 is a schematic view of an injection apparatus used in a conventional electric injection molding apparatus.
Figure 2:
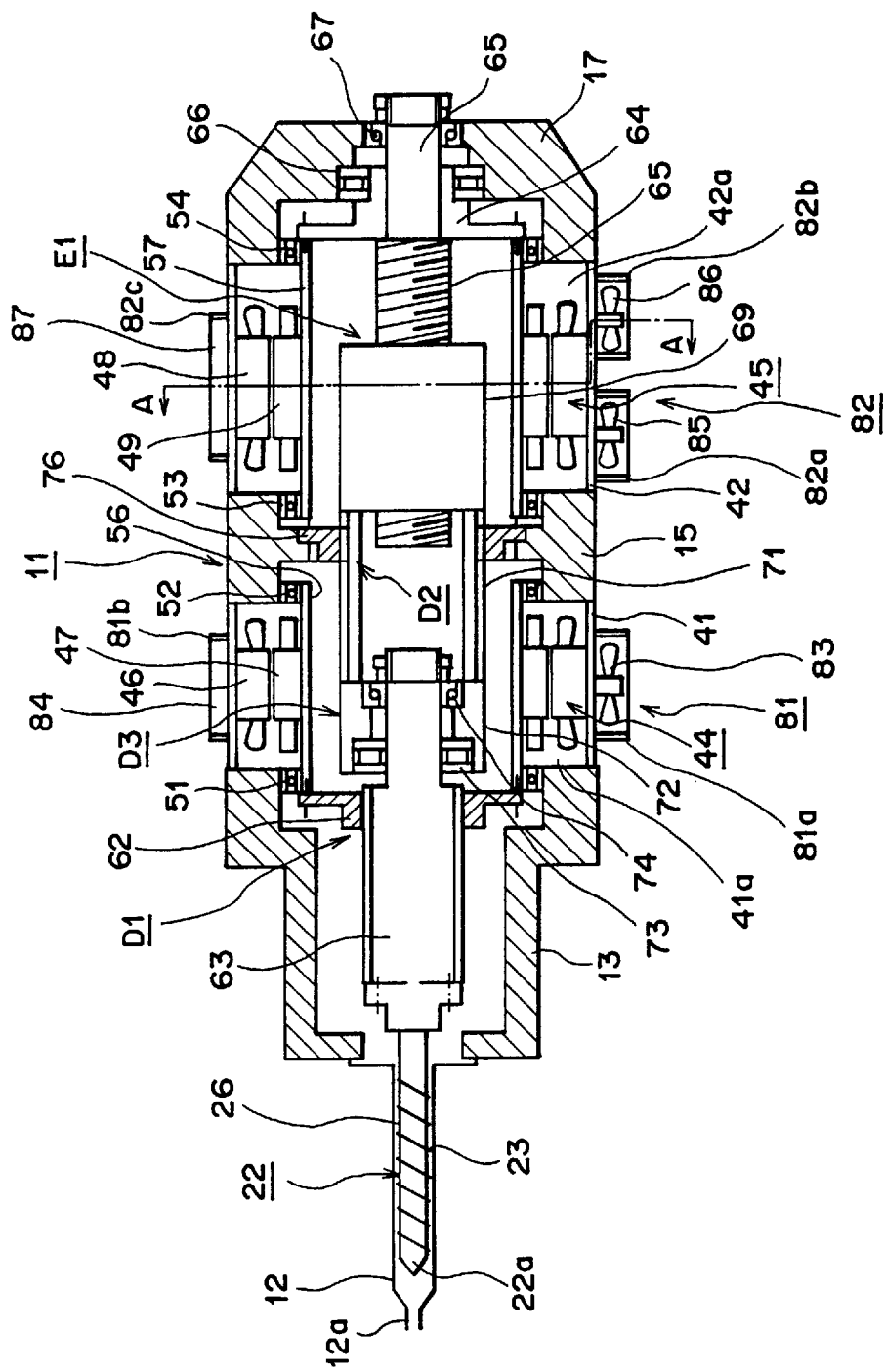
FIG. 2 is a longitudinal cross-sectional view of a built-in motor type electric injection molding apparatus according to an embodiment of the present invention.
Figure 3:
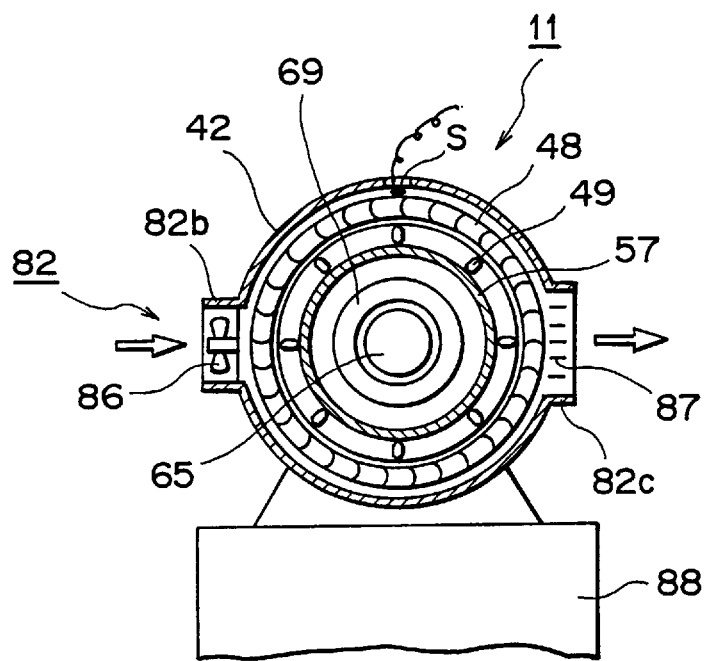
FIG. 3 is a cross-sectional view taken along line A—A in FIG. 2.
Figure 4:
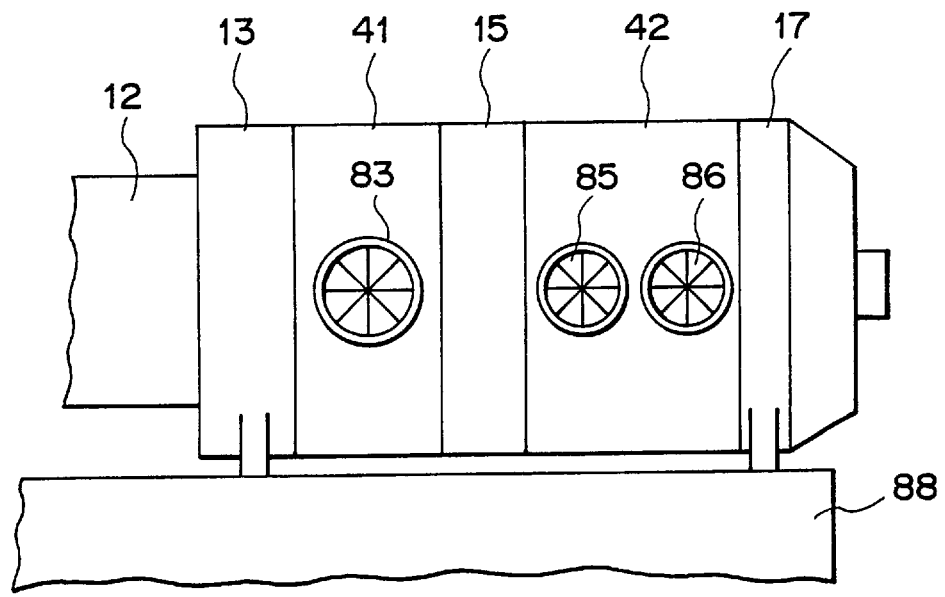
FIG. 4 is a side view of the built-in motor type electric injection molding apparatus according to the embodiment of the present invention.

FIG. 2 is a longitudinal cross-sectional view of a built-in motor type electric injection molding apparatus according to an embodiment of the present invention; FIG. 3 is a cross-sectional view taken along line A—A in FIG. 2; and FIG. 4 is a side view of the built-in motor type electric injection molding apparatus according to the embodiment of the present invention.

In these drawings, numeral 12 denotes a heating cylinder, which has an injection nozzle 12a at its front end (left-side end in FIG. 2).

A screw 22 is disposed within the heating cylinder 12 such that the screw 22 is allowed to advance, retract and rotate.

The screw 22 has a screw head 22a at its front end and extends rearward (in the rightward direction in FIG. 2). The rear end (right-side end in FIG. 2) of the screw 22 is connected to a first spline shaft 63. Also, a spiral flight 23 is formed on the peripheral surface of the screw 22, resulting in the formation of a groove 26.

An unillustrated resin supply port is formed at a predetermined position on the heating cylinder 12, and a hopper is fixed to the resin supply port. The resin supply port is formed at a position such that the resin supply port faces the rear end portion of the groove 26 when the screw 22 is positioned at a forwardmost (leftmost in FIG. 2) position within the heating cylinder 12.

In a metering stage, the screw 22 is retracted with rotation. With this operation, pelleted resin in the hopper descends and enters the heating cylinder 12. The resin is then advanced along the groove 26.

An unillustrated heater is disposed around the heating cylinder 12. The heating cylinder 12 is heated by the heater so as to melt the resin in the groove 26. Accordingly, when the screw 22 is retracted by a predetermined amount while being rotated, molten resin for one shot accumulates ahead of the screw head 22a.

In a subsequent injection stage, the screw 22 is advanced without rotation. With this operation, the resin accumulated ahead of the screw head 22a is injected from the injection nozzle 12a, and is charged into a cavity of an unillustrated die.

Meanwhile, a casing 11 is fixed to the rear end of the heating cylinder 12. The casing 11 is composed of a front cover 13, an intermediate frame 15, a rear cover 17, a front-side motor frame 41 for connecting the front cover 13 and the intermediate frame 15, and a rear-side motor frame 42 for connecting the intermediate frame 15 and the rear cover 17. As shown in FIG. 3, the casing 11 is attached to a frame 88.

A metering motor 44 and an injection motor 45 are disposed at front and rear portions of the casing 11, respectively, such that the metering motor 44 and the injection motor 45 share a common rotational axis. The metering motor 44 includes a stator 46 fixed to the motor frame 41, and a rotor 47 disposed inside the stator 46. The injection motor 45 includes a stator 48 fixed to the motor frame 42, and a rotor 49 disposed inside the stator 48.

The rotor 47 is supported so as to be rotatable with respect to the casing 11. In detail, a hollow first rotor shaft 56 is fitted into the rotor 47 and fixed thereto, and the front end of the first rotor shaft 56 is supported by the front cover 13 via a bearing 51 while the rear end of the first rotor shaft 56 is supported by the intermediate frame 15 via a bearing 52.

Similarly, the rotor 49 is supported so as to be rotatable with respect to the casing 11. In detail, a hollow second rotor shaft 57 is fitted into the rotor 49 and fixed thereto, and the front end of the second rotor shaft 57 is supported by the intermediate frame 15 via a bearing 53 while the rear end of the second rotor shaft 57 is supported by the rear cover 17 via a bearing 54.

When a current of a predetermined frequency is supplied to the stator 46 of the metering motor 44, the screw 22 is retracted while being rotated. For this purpose, a first spline nut 62 is fixed to the inner circumference of the front end of the first rotor shaft 56, the first spline nut 62 and a first spline shaft 63 are spline-engaged with each other, and the screw 22 is fixed to the front end of the first spline shaft 63. The first spline nut 62 and the first spline shaft 63 constitute a first drive force transmission means D1, which allows transmission of the rotational motion from the first spline nut 62 to the first spline shaft 63 and allows transmission of the relative axial motion therebetween. The first spline shaft 63 has a length corresponding to the stroke of the screw 22.

Accordingly, when the rotor 47 is rotated by driving the metering motor 44, the rotation of the rotor 47 is transmitted to the screw 22 via the first rotor shaft 56 and the first drive force transmission means D1, so that the screw 22 is rotated.

Since relative axial movement between the first spline nut 62 and the first spline shaft 63 is allowed, the first spline shaft 63 is retracted relative to the first spline nut 62 so as to retract the screw 22. When the screw 22 is retracted, a back pressure is applied to the screw 22 against the pressure generated by the resin.

Also, the screw 22 can be advanced without rotation by supplying the stator 48 of the injection motor 45 with a current of a predetermined frequency. For this purpose, an annular bearing retainer 64 is fixed to the rear end of the second rotor shaft 57, and the ball screw shaft 65 is fitted into the inner circumferential of the bearing retainer 64 and fixed thereto. The ball screw shaft 65 is supported to be rotatable with respect to the casing 11. In detail, the ball screw shaft 65 is supported by the rear cover 17 with a bearing 66 via the bearing retainer 64 and with a bearing 67 disposed on the rear side of the bearing 66.

A ball nut 69 is disposed within the second rotor shaft 57 in an axially movable manner. The ball nut 69 is screw-engaged with the ball screw shaft 65 to constitute a motion conversion means E1. Accordingly, rotation of the rotor 49 is transmitted to the ball screw shaft 65 via the second rotor shaft 57 and the bearing retainer 64, so that the rotational motion of the rotor 49 is converted into linear motion by the motion conversion means E1. As a result, the ball nut 69 is advanced and retracted.

To prevent the ball nut 69 from rotating together with the ball screw shaft 65, a hollow second spline shaft 71 is fixed to the front end of the ball nut 69, and a second spline nut 76 fixed to the intermediate frame 15 is spline-engaged with the second spline shaft 71. The second spline nut 76 and the second spline shaft 71 constitute a second drive force transmission means D2, which prevents transmission of the rotational motion to the second spline shaft 71 but allows transmission of the axial motion to the second spline shaft 71. The second spline shaft 71 has a length corresponding to the stroke of the screw 22.

A bearing box 72 serving as a third drive force transmission means D3 is fixed to the front end of the second spline shaft 71. A thrust bearing 73 is disposed at the front end portion in the bearing box 72 while a bearing 74 is disposed at the rear end portion in the bearing box 72. In this case, the bearing box 72 allows transmission of the axial motion from the second spline shaft 71 to the first spline shaft 63 but prevents transmission of relative rotational motion therebetween. Accordingly, the first spline shaft 63 is supported by the thrust bearing 73 and the bearing 74 while being rotatable relative to the second spline shaft 71 and the ball nut 69.

In the built-in motor type electric injection molding apparatus having the above-described structure, since the second and third drive force transmission means D2 and D3 are disposed inside the first rotor shaft 56, and the motion conversion means E1 is disposed inside the second rotor shaft 57, a first motor accommodation chamber 41a formed between the motor frame 41 and the first rotor shaft 56 and a second motor accommodation chamber 42a formed between the motor frame 42 and the second rotor shaft 57 are both narrow. Therefore, heat generated by the metering motor 44 and the injection motor 45 tends to accumulate within the first and second motor accommodation chambers 41a and 42a.

In order to solve this problem, the motor frame 41 is provided with first ventilation means 81, which ventilates the first motor accommodation chamber 41a so as to discharge the heat generated by the metering motor 44 to the outside of the casing 11. The first ventilation means 81 is composed of an air inlet port 81a that is formed in the motor frame 41 so as to open in a horizontal direction, a fan 83 disposed within the air inlet port 81a and connected to an unillustrated first ventilation motor, an air exhaust port 81b that is formed in the motor frame 41, on the side opposite the air inlet port 81a, so as to open in a horizontal direction, and straightening plates 84 disposed within the air exhaust port 81b.

Accordingly, when the first ventilation motor is driven by an unillustrated controller so as to rotate the fan 83, air outside the casing 11 is sucked into the first motor accommodation chamber 41a through the air inlet port 81a. After cooling the metering motor 44, the air is discharged from the air exhaust port 81b.

Similarly, the motor frame 42 is provided with second ventilation means 82, which ventilates the second motor accommodation chamber 42a so as to discharge the heat generated by the injection motor 45 to the outside of the casing 11. The second ventilation means 82 is composed of two air inlet ports 82a and 82b that are formed in the motor frame 42 so as to open in a horizontal direction, fans 85 and 86 disposed within the air inlet ports 82a and 82b and connected to each of unillustrated second ventilation motors, a single air exhaust port 82c that is formed in the motor frame 42, on the side opposite the air inlet ports 82a and 82b, so as to open in a horizontal direction, and straightening plates 87 disposed within the air exhaust port 82c.

Accordingly, when the second ventilation motor is driven by the controller so as to rotate the fans 85 and 86, air outside the casing 11 is sucked into the second motor accommodation chamber 42a through the air inlet ports 82a and 82b. After cooling the injection motor 45, the air is discharged from the air exhaust port 82c.

As described above, since the first and second motor accommodation chambers 41a and 42a can be ventilated by independent operation of the first and second ventilation means 81 and 82, respectively, the heat generated by the metering motor 44 and the injection motor 45 is released to the outside of the casing 11. Since no heat accumulates within the casing 11, the metering motor 44 and the injection motor 45 do not overheat, thus preventing a decrease in the output ratings of the metering motor 44 and the injection motor 45.

In addition, since optimal drive characteristics of the metering motor 44 and the injection motor 45 can be selected corresponding to such load of the built-in motor type electric injection molding apparatus in use, as the molding cycle and load cycle thereof, the metering motor 44 and the injection motor 45 can be driven more efficiently.

The first and second ventilation means 81 and 82 independently ventilate the first and second motor accommodation chambers 41a and 42a, respectively. Accordingly, when only the metering motor 44 is driven, only the first ventilation means 81 is operated, and when only the injection motor 45 is driven, only the second ventilation means 82 is operated. As a result, power consumption of the built-in motor type electric injection molding apparatus can be reduced.

In this case, the load acting on the injection motor 45 in the injection stage is greater than the load acting on the metering motor 44 in the metering stage, and the amount of heat generated by the injection motor 45 is greater than the amount of heat generated by the metering motor 44.

Accordingly, the first ventilation means 81 is provided with a single fan 83, while the second ventilation means 82 is provided with two fans 85 and 86, and the fans 83, 85 and 86 are independently operated.

The number of the fans 85 and 86 to be operated can be changed in accordance with the driving state of the injection motor 45. Accordingly, the power consumption of the built-in motor type electric injection molding apparatus can be decreased.

As shown in FIG. 3, temperature sensors S are disposed in the first and second motor accommodation chambers 41a and 42a, respectively, in the vicinity of the stators 46 and 48. The temperature sensors S detect the temperatures of the metering motor 44 and the injection motor 45. When the temperatures are detected by the temperature sensors S, detection signals are sent to the controller. Therefore, the fan 83 and the fans 85 and 86 can be selectively rotated only when predetermined conditions are satisfied, i.e., only when the temperatures of the metering motor 44 and the injection motor 45 exceed respective preset temperatures. Moreover, it is possible to rotate either or both of the fans 85 and 86 depending on the temperature of the injection motor 45 within the second motor accommodation chamber 42a. Since the first and second ventilation means 81 and 82 can be driven based on the temperatures detected by the temperature sensors S, the first and second motor accommodation chambers 41a and 42a can be ventilated only when ventilation is needed. Accordingly, the power consumption of the built-in motor type electric injection molding apparatus can be decreased.

The present invention is not limited to the above-described embodiment. Numerous modifications and variations of the present invention are possible in light of the spirit of the present invention, and they are not excluded from the scope of the present invention.

What is claimed is:

1. A built-in motor electric injection molding apparatus, comprising:
   (a) a casing;
   (b) a first rotor shaft rotatably supported within said casing and forming a first motor accommodation chamber in cooperation with said casing;
   (c) a metering motor disposed within said first motor accommodation chamber and provided with a rotor fit onto said first rotor shaft;
   (d) a second rotor shaft rotatably supported within said casing and forming a second motor accommodation chamber in cooperation with said casing, said second motor accommodation chamber being separate from said first accommodation chamber;
   (e) an injection motor disposed within said second motor accommodation chamber and provided with a rotor fit onto said second rotor shaft;
   (f) drive force transmission means disposed within said first rotor shaft and adapted to transmit rotation produced by said metering motor to a screw;
   (g) motion conversion means disposed within said second rotor shaft and adapted to convert rotational motion produced by said injection motor into linear motion and to transmit the linear motion to said screw; and
   (h) ventilation means disposed on said casing and adapted to ventilate said first and second motor accommodation chambers.

2. A built-in motor electric injection molding apparatus according to claim 1, wherein said ventilation means is composed of a first and second ventilation means, and said first and second ventilation means independently ventilate said first and second motor accommodation chambers, respectively.

3. A built-in motor electric injection molding apparatus according to claim 2, wherein said second ventilation means comprises a plurality of fans, each of which is operated independently.

4. A built-in motor electric injection molding apparatus according to claim 2, wherein first and second temperature sensors are provided, respectively, within each of said first and second motor accommodation chambers, and each of said first and second ventilation means is selectively operated responsive to the temperature detected by its respective temperature sensor.

5. A built-in motor electric injection molding apparatus according to claim 3 additionally comprising a temperature sensor within said second motor accommodation chamber and wherein the number of said plurality of fans in operation is changed responsive to temperature detected by said temperature sensor.

* * * * *